E. H. BRISTOL.
MEASURING INSTRUMENT.
APPLICATION FILED JAN. 19, 1918.
1,340,148. Patented May 18, 1920.
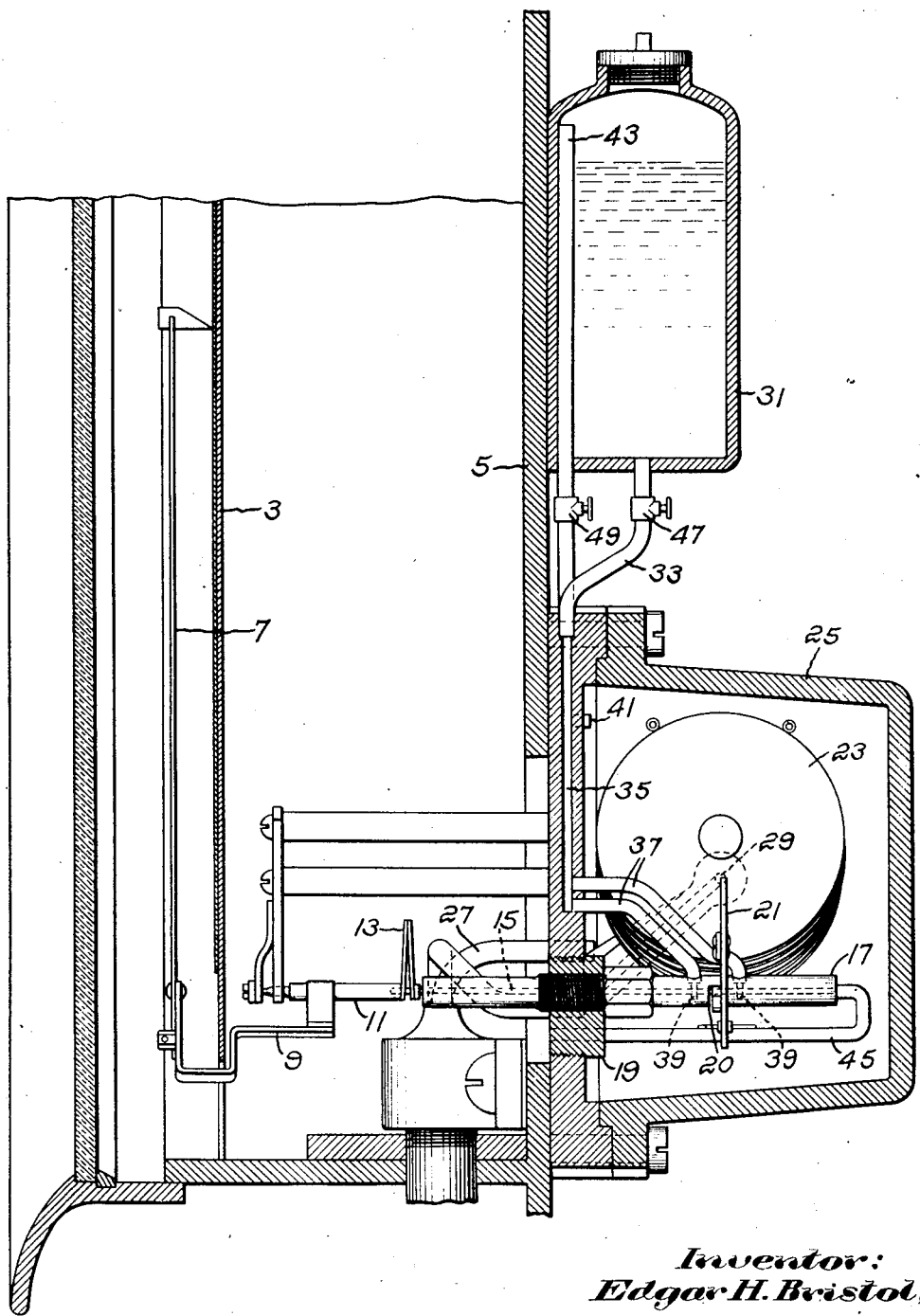
Inventor:
Edgar H. Bristol,
by Emery, Booth, Janney & Varney
Attys.

UNITED STATES PATENT OFFICE.

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS.

MEASURING INSTRUMENT.

1,340,148.     Specification of Letters Patent.     Patented May 18, 1920.

Original application filed March 3, 1913, Serial No. 751,729. Divided and this application filed January 19, 1918. Serial No. 212,556.

*To all whom it may concern:*

Be it known that I, EDGAR H. BRISTOL, a citizen of the United States, and resident of Foxboro, in the county of Norfolk and State of Massachusetts, have invented an Improvement in Measuring Instruments, of which the following description, in connection with the accompanying drawings, is a specification, like characters on the drawings representing like parts.

This application is a division of my copending application, Serial No. 751,729, filed March 3d, 1913.

This invention relates to mechanism for measuring the pressures of fluids, especially gases.

My invention will best be understood by reference to the following description taken in connection with the accompanying illustrative drawing wherein I have shown a broken away section of a measuring instrument embodying my invention.

In the drawing I have illustrated the invention as applied to a recording instrument having a dial 3 adapted to be rotated by suitable clockwork (not shown) in the case 5 and over which sweeps a hand or pen 7 controlled by pressure responsive mechanism. Herein the hand is moved by a crank 9 from a shaft 11 connected by a spring device 13, such as is described in my prior application, Serial Number 741,198, filed Jan. 10, 1913, with a shaft 15 mounted in a tubular bearing 17 carried by a plug 19 in the case 5. The bearing is laterally recessed at 20 to permit attachment to the shaft of a link 21 secured to an expansion tube 23 of well-known form mounted in the pressure receiving chamber 25 which is secured to the back of case 5. In the embodiment of the invention here shown the tube responds to differential pressures and moves the hand 7 in amount corresponding to the algebraic sum of the pressure within the chamber 25 but external to the tube 23, (such pressure being admitted through pipe 27,) and the pressure admitted to the interior of the tube through a port 29. Obviously one of the two pressures might be merely the pressure of the atmosphere.

To insure accuracy of the instrument there should be no leaking and this in many instances is desirable for other reasons, as where the pressures the difference of which is to be measured are those of gases which are noxious or even poisonous. My present invention provides for an effective sealing of the chamber 25 insuring the accuracy of the instrument, protecting the parts thereof, such as the clockwork mechanism, from contact with the fluid the pressure of which is measured, and preventing its escape into the surrounding atmosphere in however small quantities. The means employed, moreover, facilitate the registering action of the instrument.

Obviously one source of leakage is the space between shaft 15 and its bearing 17 and since the shaft must turn freely and in response to very slight forces, it is difficult to pack this shaft. My present invention provides for a fluid seal which will prevent the escape of gas around the shaft 15 to the exterior of the chamber 25 and which not only will not impede but will facilitate the rotary movements of the shaft. For this purpose I provide on the exterior of the casing 5 a fluid reservoir 31 adapted to be filled with oil of suitable viscosity. A discharge pipe 33 leads from the bottom of this reservoir and leads through duct 35, through one or more discharge pipes 37 (herein two), to the bearing of shaft 15. The pipes 37 may discharge to suitable bores 39 in the bearing about the shaft, these bores in the present instance being at opposite sides of the cut-away portion 20 of the bearing which provides for connection to the shaft of the link 21.

To facilitate feeding of the oil from the reservoir to the shaft against the pressure of fluid in the chamber 25 and for further purposes hereinafter to be mentioned, the interior of the chamber is connected by a port 41 and a pipe 43 to the top of the reservoir 31, so that the pressure on the surface of the oil is the same as the pressure within the chamber 25.

The mechanism just described not only insures thorough lubrication of the shaft in the ordinary way but has a particular function in an instrument of this kind. The oil around the shaft forms a fluid seal for the same which prevents the escape of gas from the chamber 25. The pressure of the gas, however, is such that the oil is slowly forced to the left in the figure and gradually seeps out from the left-hand end of the bearing 17. If the shaft were oiled in the ordinary way it would soon become dry and hard to move, and furthermore, the seal would soon be destroyed.

In the present instance, the oil is constantly fed to the shaft to supply the wastage caused by seepage. Furthermore, this oil is under the pressure existing in the casing 25. This not only makes possible the feeding of oil but effectually prevents escape of gas from the chamber, since the pressure of that gas is balanced by the pressure of the oil which is driven down by the gas pressure communicated to its surface by the pipe 43. Hence, the bearing is always lubricated and is efficiently sealed, the leakage or seepage being from the reservoir 31 to the left-hand of the bearing and not from the chamber 25 to that end of the bearing.

Preferably a tube 45 is provided which leads to the exterior of the chamber 25 and serves to maintain the inner end of shaft 15 under exterior pressure. Thus not only are the end pressures on the shaft balanced but effective lubrication of the right hand end of bearing 17 is provided for in the manner already explained.

The reservoir 31 is of such size as to require only infrequent filling. I may, however, provide small valves 47 and 49 in the pipes 33 and 43 respectively, so that the flow of oil from the reservoir may be cut off and the pressure from the interior of the chamber 25 excluded when it is desired to open the reservoir for refilling.

Having thus described my invention, what I claim as new and desire to secure by Letters Patent is:—

1. In a device of the class described, the combination of an index; responsive means for controlling the same; a chamber containing said responsive means; means for transmitting movement from said responsive means to said index including an elongated shaft and bearing; connections from said responsive means to said shaft; oil supply means opening to the exterior of said chamber arranged to supply oil to said shaft at points on opposite sides of the point of connection of said connections with said shaft; and means for maintaining the same pressures in said chamber and in said oil supply means.

2. In a device of the class described, the combination of an index; responsive means; a chamber containing the latter; means to conduct pressures to said responsive means and chamber; means to transmit movement of said responsive means to said index including a shaft and its bearing, the latter having a lateral recess therein; means connecting said responsive means to said shaft through said recess; lubricant supply means accessible from the exterior of said chamber arranged to supply lubricant to said shaft at opposite sides of said recess; and means to maintain the same pressures in said chamber and in said lubricant supply means.

3. In a device of the class described, the combination of an index; responsive means; a chamber inclosing the latter; means to conduct fluid pressures to said responsive means and chamber; means for transmitting movement from said responsive means to said index including a shaft and bearing projecting from the interior of said chamber to the exterior thereof; means to connect said responsive means to said shaft; a closed oil reservoir arranged to supply oil to said shaft at points on opposite sides of the point of connection with said shaft; and means for maintaining the pressure of said chamber in said reservoir.

4. In a device of the class described, the combination of an index; responsive means; a chamber inclosing the latter; means to conduct fluid pressures to said responsive means and chamber; means to transmit movement of said responsive means to said index including a shaft and its bearing; connecting means from said responsive means to said shaft and connected to the shaft between the ends of the shaft bearing; a reservoir; conduits leading from said reservoir to points of said bearing opposite the point of connection of said connecting means; and a conduit leading from said chamber to the top of said reservoir whereby to maintain the pressure in said chamber on the surface of the oil in said reservoir.

5. In a device of the class described, responsive means; a chamber containing the latter; means to conduct pressures to said responsive means and chamber; an index exterior to the chamber; means to transmit movement of said responsive means to said index including an elongated bearing, a shaft therein extending through the wall of the chamber, a connection between the shaft and the responsive means, said bearing being laterally recessed to provide for such connection; a closed lubricant reservoir; a duct therefrom opening to said shaft on opposite sides of the recess; a connection between the interior of the reservoir and the chamber and a connection 45 from the rear of said bearing and the exterior of the chamber.

In testimony whereof, I have signed my name to this specification.

EDGAR H. BRISTOL.